United States Patent
Endou et al.

(12)

(10) Patent No.: US 6,274,695 B1
(45) Date of Patent: Aug. 14, 2001

(54) ALIGNING AGENT FOR LIQUID CRYSTAL

(75) Inventors: Hideyuki Endou; Takayasu Nihira; Hiroyoshi Fukuro, all of Funabashi (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 0 days.

(21) Appl. No.: 09/403,766

(22) PCT Filed: Apr. 28, 1998

(86) PCT No.: PCT/JP98/01955

§ 371 Date: Nov. 1, 1999

§ 102(e) Date: Nov. 1, 1999

(87) PCT Pub. No.: WO98/49596

PCT Pub. Date: Nov. 5, 1998

(30) Foreign Application Priority Data

Apr. 30, 1997 (JP) .................................................. 9-113002

(51) Int. Cl.⁷ ........................ C08G 69/26; C08G 73/00; C08K 3/28; G02F 1/1337
(52) U.S. Cl. ...................... 528/170; 528/172; 528/173; 528/174; 528/179; 528/183; 528/188; 528/220; 528/224; 528/229; 528/310; 528/312; 528/322; 528/332; 528/335; 528/336; 528/350; 528/351; 528/353; 522/134; 522/162; 522/164; 522/167; 428/1.2; 428/1.25; 428/1.26; 428/473.5; 428/474.4
(58) Field of Search ..................................... 428/1.2, 1.26, 428/1.25, 473.5, 474.4; 528/350, 351, 353, 173, 183, 172, 188, 170, 199, 310, 332, 174, 335, 336, 322, 220, 224, 229; 522/134, 162, 164, 167

(56) References Cited

U.S. PATENT DOCUMENTS

| 5,538,823 | 7/1996 | Park et al. .............................. 430/20 |
| 6,001,277 | * 12/1999 | Ichimura et al. ..................... 428/1.1 |
| 6,063,829 | * 5/2000 | Endou et al. ......................... 522/164 |

FOREIGN PATENT DOCUMENTS

| 1-115928 | * 5/1989 | (JP) . |
| 3-81327 | * 4/1991 | (JP) . |
| 3-179025 | * 8/1991 | (JP) . |
| 6-287453 | * 10/1994 | (JP) . |
| 8-328005 | * 12/1996 | (JP) . |
| 8-328015 | * 12/1996 | (JP) . |

* cited by examiner

*Primary Examiner*—P. Hampton-Hightower
(74) *Attorney, Agent, or Firm*—Oblon, Spivak, McClelland, Maier & Neustadt, P.C.

(57) ABSTRACT

The present invention relates to a treating agent for liquid crystal alignment, which is an agent for liquid crystal alignment to be used for a method in which polarized ultraviolet rays or electron rays are irradiated on a polymer thin film formed on a substrate in a predetermined direction relative to the substrate plane, and said substrate is used for aligning liquid crystal without rubbing treatment, wherein said agent for liquid crystal alignment contains a polymer compound having photochemically reactive groups in the polymer main chain and a glass transition temperature of at least 200° C.

6 Claims, No Drawings

ALIGNING AGENT FOR LIQUID CRYSTAL

BACKGROUND OF THE INVENTION

1. Technical Field

The present invention relates to a treating agent for alignment of liquid crystal, and more particularly, it relates to a novel treating agent for liquid crystal alignment to be used for a method in which liquid crystal molecules are aligned by irradiating ultraviolet rays, etc. on the surface of a polymer thin film without rubbing treatment.

2. Background Art

A liquid crystal display device is a display device utilizing an electro optical change of liquid crystal, and as an apparatus, it is small in size and light in weight and has an attractive feature such that the power consumption is small. Accordingly, in recent years, it has undergone remarkable developments as a display device for various types of displays. Among them, an electric field effect type liquid crystal display device of twisted nematic type (TN type) is a typical one, wherein nematic liquid crystal having positive dielectric anisotropy is employed, liquid crystal molecules are aligned at the respective interfaces of a pair of electrode substrates disposed to face each other, in parallel with the substrates, and the two substrates are combined so that the alignment directions of liquid crystal molecules will cross each other.

In such a TN type liquid crystal display device, it is important that long axes directions of liquid crystal molecules are uniformly aligned in parallel on the substrate surface and further that liquid crystal molecules are aligned with a certain inclined alignment angle (hereinafter referred to as a tilt angle) to the substrate.

Heretofore, two methods have been known as typical methods for aligning liquid crystal molecules in such a manner. The first method is a method wherein an inorganic substance such as silicon oxide is vapor-deposited from an oblique direction to a substrate to form an inorganic film on the substrate, so that liquid crystal molecules are aligned in the direction of vapor deposition. This method is not industrially efficient, although stabilized alignment with a constant tilt angle can be obtained. The second method is a method wherein an organic coating film is formed on the surface of a substrate, and the surface is rubbed with a cloth of e.g. nylon or polyester in a predetermined direction, so that liquid crystal molecules are aligned in the direction of rubbing. By this method, stabilized alignment can be obtained relatively easily, and industrially, this method is mainly employed. As the organic film, polyvinyl alcohol, polyoxyethylene, polyamide or polyimide may, for example, be mentioned. However, from the viewpoint of chemical stability, thermal stability, etc., polyimide is most commonly employed. As a typical example of such polyimide used for a liquid crystal alignment film, one disclosed in JP-A-61-47932 may be mentioned.

The treating method for aligning liquid crystal by rubbing polyimide is an industrially useful method which is simple and excellent in the productivity. However, along with an increasing demand for high performance and high refinement of liquid crystal display devices and accompanying developments of the corresponding new display systems, various problems of the rubbing method have been pointed out. Such new display systems include, for example, a STN (super twisted nematic) system wherein the twist angle of the TN type liquid crystal display is increased, an AM (active matrix) system wherein switching elements are formed on individual electrodes, a FLC (ferroelectric) or AFLC (antiferroelectric) system wherein a ferroelectric liquid crystal or an antiferroelectric liquid crystal is employed. Various problems of the rubbing method have been made apparent such that in the STN system, the contrast is so high that scratches on the surface of the alignment film formed by rubbing tend to display defects, in the AM system, the mechanical force or static electricity by rubbing is likely to destroy the switching elements, or dust formed by rubbing is likely to bring about display defects, and in the FLC or AFLC system, it is difficult to satisfy both quick response and uniform alignment of smectic liquid crystal solely by simple rubbing treatment.

For the purpose of solving these problems, a so-called "rubbingless" alignment method has been studied wherein liquid crystal is aligned without rubbing, and various methods have been proposed. For example, a method wherein photochromic molecules are introduced to the surface of the alignment film, and the molecules at the alignment film surface are aligned by light (JP-A-4-2844), a method wherein a LB film (Langmuir Blodgett film) is employed to align molecular chains constituting the alignment film (S. Kobayashi et al., Jpn. J. Appl. Phys., 27,475 (1988)), a method wherein an alignment film is pressed on a substrate which is preliminarily treated for alignment, to transfer the alignment (JP-A-6-43458), have been studied, but when the industrial productivity is taken into account, none of them can be a substitute for the rubbing method.

Whereas, various methods have been proposed in which periodical irregularities are intentionally formed on the alignment film surface, so that liquid crystal molecules are aligned along such irregularities. The simplest method among them is a method wherein a replica having periodical irregularities is preliminarily prepared, and a thermoplastic film is heat-pressed thereon to copy the irregularities on the film (JP-A-4-172320, JP-A-4-296820, JP-A-4-311926, etc.). By this method, it is certainly possible to efficiently prepare a film having periodical irregularities on the surface, but it has been impossible to obtain practical reliabilities at a level of a polyimide film used for the rubbing method. Whereas, a method has been proposed to form periodical irregularities on a film surface by irradiating a highly reliable polyimide film with a high energy light, such as an electron beam (JP-A-4-97130), $\alpha$-rays (JP-A-2-19836), X-rays (JP-A-2-2515) or excimer laser (JP-A-5-53513). However, using such a high energy light source can hardly be regarded as an efficient method for alignment treatment, when the industrial productivity for continuously carrying out alignment treatment uniformly on the entire surface of a large size substrate, is taken into consideration.

On the other hand, as an efficient method for forming periodical irregularities on the surface of a highly reliable polyimide film, a photolithographic method may be mentioned. By virtue of its high insulating property and excellent electrical characteristics, polyimide has been used as an insulating film for semiconductors, and in recent years, a so-called photosensitive polyimide has been developed which has a photo-curing property by the polyimide itself. An attempt has been made to employ this photo-curable polyimide to form periodical irregularities by a photolithographic method. By this method, it has been certainly possible to form irregularities on the polyimide film surface, but the photo-curable polyimide has been initially developed as an insulating film. Accordingly, the property to align liquid crystal has been inadequate, and it has been necessary to coat a buffer layer (JP-A-4-245224), whereby the process has tended to be complex, and in view of the industrial productivity, such a method can not be regarded as an efficient method for alignment treatment which may be a substitute for the rubbing method.

As a new method for alignment treatment recently discovered, a method has been proposed wherein polarized ultraviolet rays, etc. are irradiated to the surface of a polymer film, whereby liquid crystal molecules are aligned without rubbing treatment. For example, the following reports are available.

W. M. Gibbons et al., Nature, 351, 49(1991), Y. Kawanishi et al., Mol. Cryst. Liq. Cryst., 218, 153 (1992), M. Shadt et al., Jpn. J. Appl. Phys. 31, 2155 (1992), and Y. Iimura et al., Jpn. J. Appl. Phys. 32, L93 (1993).

These methods are characterized in that liquid crystal is aligned in a certain predetermined direction by irradiation with polarized light without requiring conventional rubbing treatment. These methods are free from problems characteristic to the rubbing method such as static electricity or scratches on the film surface and have a merit that they are convenient as a production process when industrial production is taken into consideration.

Namely, the method for liquid crystal alignment employing irradiation of polarized light, proposed here, is still in a basic research stage, but is expected to be a method which is prospective as a new treating method for liquid crystal alignment using no rubbing treatment in the feature.

As a film material for liquid crystal alignment used in the previous reports, it has been proposed to employ a polymer compound having photo chemically reactive groups introduced into side chains of the polymer, from the necessity to obtain a photochemical sensitivity to the polarized light. As a typical example, polyvinyl cinnamate may be mentioned. In this case, it is believed that an anisotropy will be formed in the polymer film by dimerization at the side chain portions by light irradiation, whereby liquid crystal is aligned. Further, as another example, it is described that a low molecular weight dichromatic azo dye is dispersed in a polymer material, and polarized light is irradiated to the surface of this film, whereby liquid crystal molecules can be aligned in a predetermined direction. Still further, it is reported that liquid crystal molecules are aligned by irradiating polarized ultraviolet rays, etc., to a certain specific polyimide film. It is believed that in this case, polyimide main chains in the predetermined direction are decomposed by the irradiation, whereby liquid crystal alignment is produced.

With a polymer material having photo chemically reactive groups introduced to side chains of the polymer, as represented by e.g. polyvinyl cinnamate, the thermal stability of alignment is inadequate, and no adequate reliability has been obtained from the practical viewpoint. Further, in this case, the structural moieties which produce alignment of liquid crystal are considered to be side chain portions of the polymer, and such may not be necessarily desirable with a view to obtaining uniform and secure alignment of liquid crystal molecules. Whereas, in the case where a low molecular weight dichromatic dye is dispersed in a polymer, the dye which aligns liquid crystal is of a low molecular weight itself, and from the practical viewpoint, problems remain from the aspect of reliability against heat or light. Further, with the method wherein polarized ultraviolet rays are irradiated to the specific polyimide, as the polyimide itself, the reliability in e.g. heat resistance, is high, but the alignment mechanism is considered to be attributable to decomposition by light, whereby it is likely that in the feature, adequate reliability may not necessarily be obtained from the practical viewpoint.

Namely, in a case where liquid crystal alignment employing this polarized light irradiation is practically applied in the future, it will be required not only to simply align liquid crystal initially, but, from the viewpoint of reliability, to secure more stable alignment. Further, when a practical industrial application is taken into consideration, it is desired to select a polymer structure having also thermally high reliability, and it is also desired to discover a treating agent for alignment using a polymer material having a wider range of selection for the structure. From these viewpoints, polymer materials so far proposed for liquid crystal alignment by irradiation, are not necessarily satisfactory from the aspects of alignment power and its stability, which constitutes a serious problem against practical application of rubbingless alignment by irradiation. The object of the present invention is to provide a treating agent for liquid crystal alignment whereby liquid crystal is aligned by light irradiation to a liquid crystal alignment film without rubbing treatment of the liquid crystal alignment film, and whereby uniform and stable liquid crystal alignment can be secured by a highly heat resistant polymer material.

DISCLOSURE OF THE INVENTION

As a result of an extensive effort and study to solve the above problems, the present inventors have finally accomplished the present invention. Namely, the present invention relates to a treating agent for liquid crystal alignment, which is an agent for liquid crystal alignment to be used for a method in which polarized ultraviolet rays or electron rays are irradiated on a polymer thin film formed on a substrate in a predetermined direction relative to the substrate plane, and said substrate is used for aligning liquid crystal without rubbing treatment, wherein said agent for liquid crystal alignment contains a polymer compound having photochemically reactive groups in the polymer main chain and a glass transition temperature of at least 200° C.

BEST MODE FOR CARRYING OUT THE INVENTION

In the present invention, the treating agent for liquid crystal alignment is meant for a polymer thin film formed on an electrode-attached substrate made of glass or plastic or the like, in order to carry out control of e.g. alignment of liquid crystal and the tilt angle. Namely, the treating agent for liquid crystal alignment of the present invention is one to be used in such a manner that a solution of the treating agent for liquid crystal alignment of the present invention is coated on an electrode-attached substrate, such as a glass sheet or a plastic film provided with transparent electrodes, followed by baking to form a polymer film, and then, polarized ultraviolet rays, etc. are irradiated to the film surface, so that it will be used as a treating agent for liquid crystal alignment without rubbing treatment. For the polymer thin film formed by the treating agent for liquid crystal alignment of the present invention, it is essential to contain in the main chain of the polymer photochemically reactive groups which are chemically changeable under irradiation of light. Namely, for the present invention, it is important that the photochemically reactive groups are introduced in the main chain of the polymer rather than in the side chains of the polymer, in order to obtain effects of the present invention, such as stability of alignment.

Further, in order to obtain thermal stability of alignment, it is essential that the above polymer has a glass transition point of at least 200° C., or shows no glass transition point. Otherwise, the polymer thin film formed on the substrate may be chemically changed by irradiation, so that the reaction product has a glass transition point of at least 200° C. If the glass transition point is lower than 200° C., it is likely that no adequate stability of alignment is obtainable, such being undesirable. Namely, to realize stable liquid crystal alignment by light, the polymer has photochemically reactive groups in its main chain, and the polymer compound and a polymer compound chemically modified by light irradiation have a sufficiently high glass transition point of at least 200° C., whereby liquid crystal molecules can be aligned uniformly and stably in a predetermined direction to the polarized light direction.

The polymer compound to be incorporated to the treating agent for liquid crystal alignment in the present invention, is not particularly limited, so long as it is a compound having photochemically reactive groups in the main chain of the polymer, and having a glass transition point of at least 200° C. or showing no glass transition point. Specific examples of such a polymer compound include polyimide, polyamide, polyamideimide, polyester and polyurethane. With a view to obtaining thermal stability of liquid crystal alignment, particularly preferred is a polymer compound whereby high thermal stability can easily be obtained, such as polyamide, polyimide or polyamideimide. Further, with respect to the photochemically reactive groups contained in the main chain of the polymer of the present invention, a polymer compound having a structure selected from the following formulae (1) to (4) is preferred from the viewpoint of liquid crystal alignment.

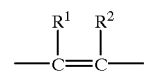
(1)

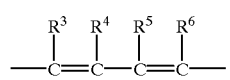
(2)

(3)

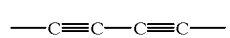
(4)

(wherein each of $R^1$, $R^2$, $R^3$, $R^4$, $R^5$ and $R^6$ which are independent of one another is hydrogen, a $C_1$–$C_4$ alkyl group, a $C_2$–$C_4$ alkenyl group, a $C_2$–$C_4$ alkynyl group, a $C_1$–$C_4$ alkoxy group, a trifluoromethyl group or fluorine.)

Further, these photochemically reactive groups may be used alone as one type or in combination of two or more types.

The $C_1$–$C_4$ alkyl group for $R^1$, $R^2$, $R^3$, $R^4$, $R^5$ and $R^6$ in the above photochemically reactive groups, includes, for example, methyl, ethyl, propyl, i-propyl, butyl, i-butyl, s-butyl and t-butyl.

The $C_1$–$C_4$ alkenyl group includes, for example, ethenyl, allyl, 1-butenyl, 2-butenyl and 3-butenyl.

The $C_2$–$C_4$ alkynyl group includes, for example, ethynyl, propargyl, 1-butynyl, 2-butynyl and 3-butynyl.

The $C_1$–$C_4$ alkoxy group includes, for example, methoxy, ethoxy, propoxy, i-propoxy, butoxy, i-butoxy, s-butoxy and t-butoxy.

Further, with respect to the photochemically reactive groups contained in the main chain of the polymer of the present invention, a polymer compound having a structure selected from the following formulae (5) to (6) is also preferred from the viewpoint of the liquid crystal alignment property.

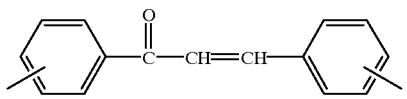
(5)

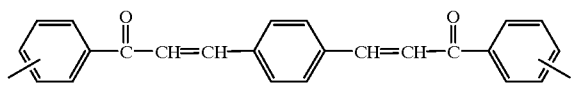
(6)

The polymer compound in the present invention is not particularly limited so long as it contains photochemically reactive groups in its main chain and the glass transition point is at least 200° C. For example, in the polyamide represented by the following formula (7):

(7)

(wherein each of $R^7$ and $R^8$ is a bivalent organic group), a photochemically reactive group may be contained in either the carboxylic acid component or the diamine component. Otherwise, photochemically reactive groups may be contained in both the carboxylic acid component and the diamine component. Further, within a range wherein the effects of the present invention can be obtained, other carboxylic acid components or diamine components may be used in combination.

Specific examples of the dicarboxylic acid component having a photochemically reactive group include, in addition to dicarboxylic acids having an unsaturated hydrocarbon group with one double bond, dicarboxylic acids such as buta-1,3-diene-1,4-dicarboxylic acid (muconic acid):

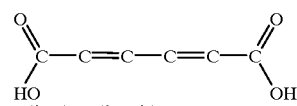
hexa-1, 3-diene-1, 6-dicarboxylic acid:

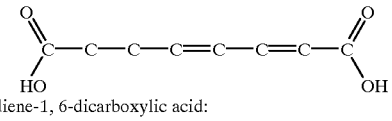
hexa-2, 4-diene-1, 6-dicarboxylic acid:

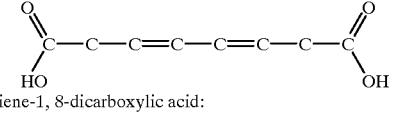
octa-1, 3-diene-1, 8-dicarboxylic acid:

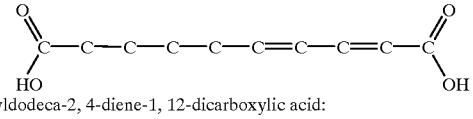
1-butyldodeca-2, 4-diene-1, 12-dicarboxylic acid:

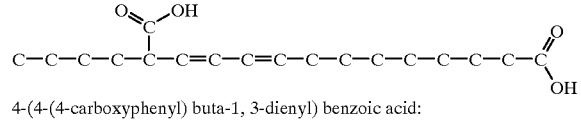
4-(4-(4-carboxyphenyl) buta-1, 3-dienyl) benzoic acid:

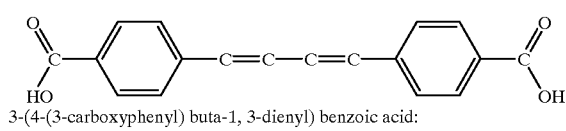
3-(4-(3-carboxyphenyl) buta-1, 3-dienyl) benzoic acid:

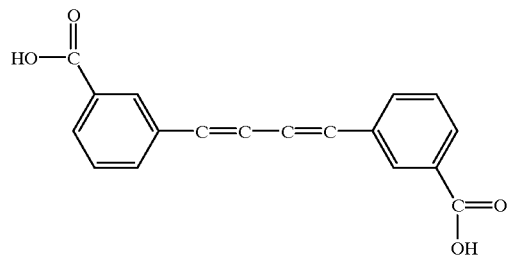
5-oxopenta-1, 3-diene-1, 5-dicarboxylic acid:

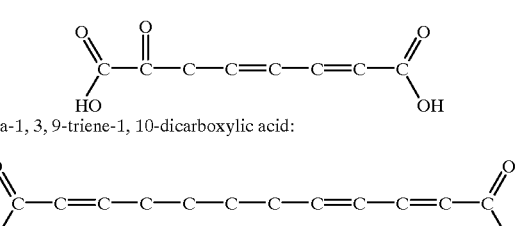
6-oxohexa-1, 3-diene-1, 6-dicarboxylic acid:

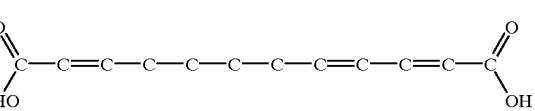
deca-1, 3, 9-triene-1, 10-dicarboxylic acid:

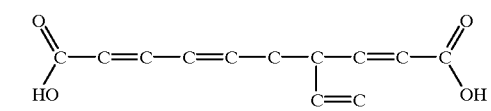
6-vinylocta-1, 3, 7-triene-1, 8-dicarboxylic acid:

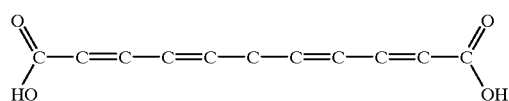
nona-1, 3, 6, 8-tetraene-1, 9-dicarboxylic acid:

ethyne-1, 2-dicarboxylic acid:

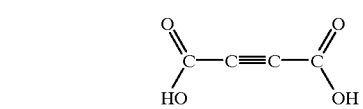
prop-1-yne-1, 3-dicarboxylic acid:

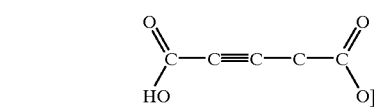
but-1-yne-1, 4-dicarboxylic acid:

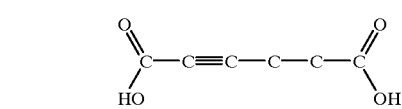
but-2-yne-1, 4-dicarboxylic acid:

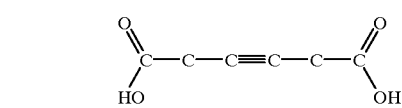
pent-1-yne-1, 5-dicarboxylic acid:

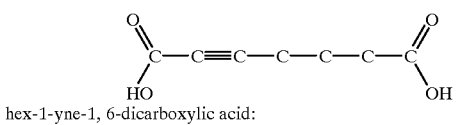
hex-1-yne-1, 6-dicarboxylic acid:

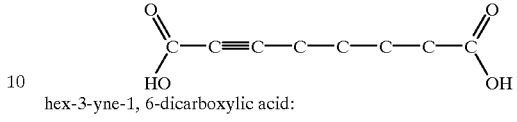
hex-3-yne-1, 6-dicarboxylic acid:

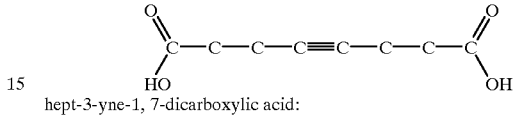
hept-3-yne-1, 7-dicarboxylic acid:

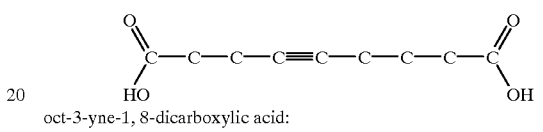
oct-3-yne-1, 8-dicarboxylic acid:

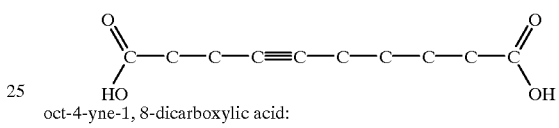
oct-4-yne-1, 8-dicarboxylic acid:

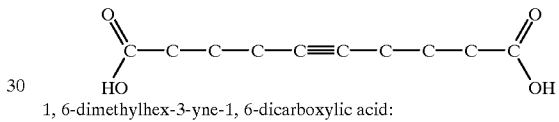
1, 6-dimethylhex-3-yne-1, 6-dicarboxylic acid:

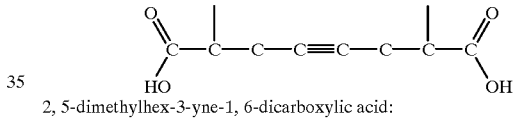
2, 5-dimethylhex-3-yne-1, 6-dicarboxylic acid:

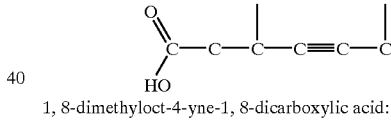
1, 8-dimethyloct-4-yne-1, 8-dicarboxylic acid:

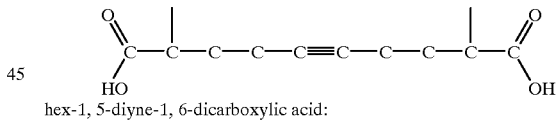
hex-1, 5-diyne-1, 6-dicarboxylic acid:

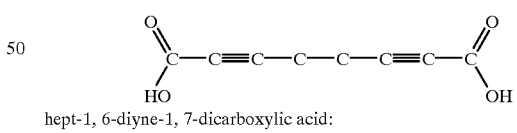
hept-1, 6-diyne-1, 7-dicarboxylic acid:

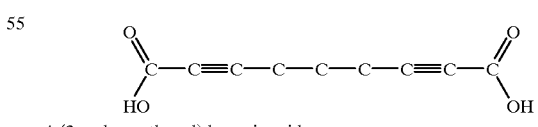
4-(2-carboxyethynyl) benzoic acid:

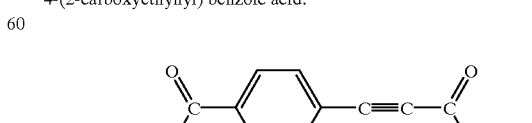
3-(2-(3-carboxyphenyl) ethynyl) benzoic acid:

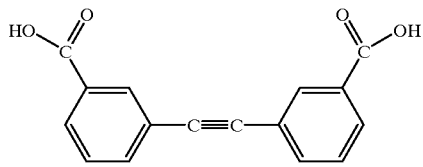

2-(2-(4-carboxyphenyl) ethynyl) benzoic acid:

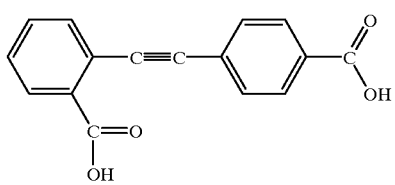

2-(2-(2-carboxyphenyl) ethynyl) benzoic acid:

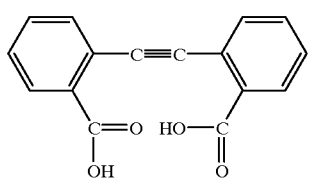

4-(2-(4-carboxyphenyl) ethynyl) benzoic acid:

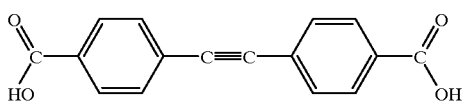

and their acid halides, acid anhydrides and alkyl esters. Further, a mixture of two or more of them may be used.

Further, from the viewpoint of the stability of liquid crystal alignment, muconic acid is preferred. A polyamide employing muconic acid is represented by a repeating unit of the following Formula (8):

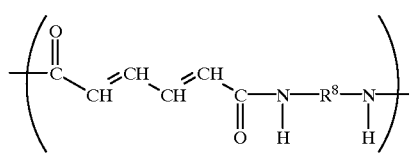

(8)

(wherein $R^8$ is a bivalent organic group)

Specific examples of the diamine compound having a photochemically reactive group, include, in addition to diamines having one unsaturated hydrocarbon group, buta-1,3-diene-1,4-diamine:

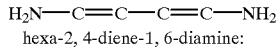

(1)

hexa-2, 4-diene-1, 6-diamine:

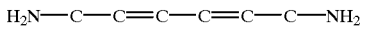

(2)

octa-3, 5-diene-1, 8-diamine:

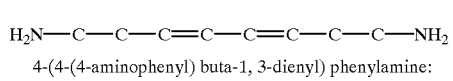

(3)

4-(4-(4-aminophenyl) buta-1, 3-dienyl) phenylamine:

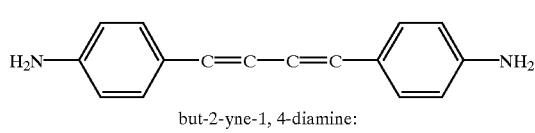

(4)

but-2-yne-1, 4-diamine:

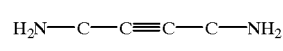

(5)

hex-3-yne-2, 5-diamine:

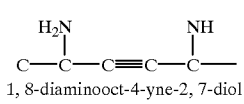

(6)

1, 8-diaminooct-4-yne-2, 7-diol:

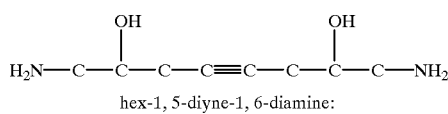

(7)

hex-1, 5-diyne-1, 6-diamine:

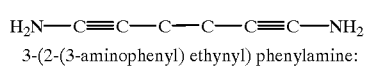

(8)

3-(2-(3-aminophenyl) ethynyl) phenylamine:

(9)

3-(2-(4-aminophenyl) ethynyl) phenylamine:

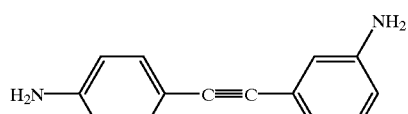

(10)

4-(2-(4-aminophenyl) ethynyl) phenylamine:

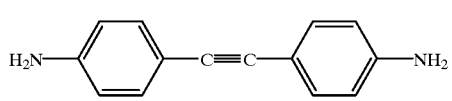

(11)

2-(2-(2-aminophenyl) ethynyl) phenylamine:

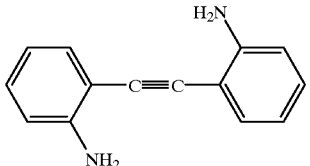

(12)

5-(2-(3-aminophenyl) ethynyl)-2-fluorophenylamine:

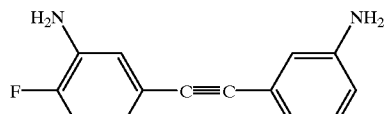

(13)

4-(2-(3-aminophenyl) ethynyl)-3-(trifluoromethyl) phenylamine:

(14)

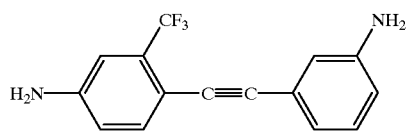

5-(2-(2-amino-4-methoxyphenyl) ethynyl)-2-nitrophenylamine:

(15)

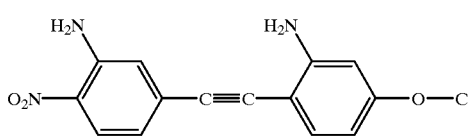

2-(2-(3-amino-4-methoxyphenyl) ethynyl)-5-nitrophenylamine:

(16)

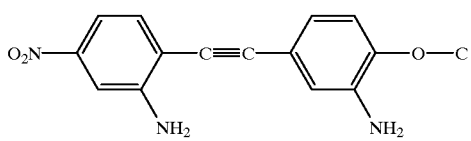

4, 4'-diaminochalcone:

(17)

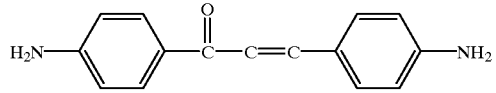

1, 4-(bis-(4-aminobenzoylethenyl)) benzene:

(18)

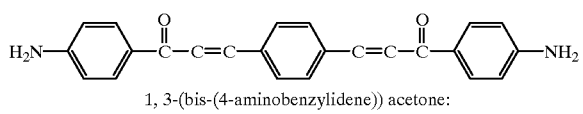

1, 3-(bis-(4-aminobenzylidene)) acetone:

(19)

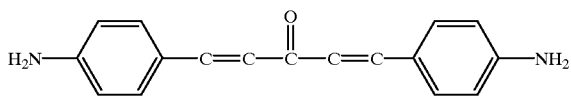

These diamine components may be used alone or in combination as a mixture of two or more of them.

Further, from the viewpoint of the sensitivity to the photochemical reaction, 4,4'-diaminochalcone, 1,4-(bis-(4-aminobenzoylethenyl))benzene or 1,3-(bis-(4-aminobenzylidene))acetone is preferred.

From the viewpoint of the stability of alignment of liquid crystal, repeating units containing the above-mentioned photochemically reactive groups are contained preferably in an amount of from 20 to 100 mol %, more preferably from 50 to 100 mol %, based on the entire polymer components.

Further, specific examples of the common carboxylic acid component having no photochemically reactive group, include dicarboxylic acids such as terephthalic acid, isophthalic acid, 2,6-naphthalenedicarboxylic acid, 1,6-naphthalenedicarboxylic acid, 2,6-anthracenedicarboxylic acid, 1,6-anthracenedicarboxylic acid, 4,4'-biphenyldicarboxylic acid, oxalic acid, fumaric acid, maleic acid, malonic acid, succinic acid, glutaric acid, adipic acid, pimelic acid, suberic acid, mazelaic acid, sebacic acid, 1,9-nonandicarboxylic acid and 1,10-decanedicarboxylic acid, and their acid halides, acid anhydrides and alkyl esters. Further, a mixture of two or more of them may also be employed.

Further, specific examples of a diamine having no photochemically reactive group, include aromatic diamines such as p-phenylenediamine, m-phenylenediamine, 2,5-diaminotoluene, 2,6-diaminotoluene, 4,4'-diaminobiphenyl, 3,3'-dimethyl-4,4'-diaminobiphenyl, 3,3'-dimethoxy-4,4'-diaminobiphenyl, diaminodiphenylmethane, diaminodiphenyl ether, 2,2'-diaminodiphenylpropane, bis(3,5-diethyl-4-aminophenyl)methane, diaminodiphenylsulfone, diaminobenzophenone, diaminonaphthalene, 1,4-bis(4-aminophenoxy)benzene, 1,4-bis(4-aminophenyl)benzene, 9,10-bis(4-aminophenyl)anthracene, 1,3-bis(4-aminophenoxy)benzene, 4,4'-bis(4-aminophenoxy)diphenylsulfone, 2,2-bis[4-(4-aminophenoxy)phenyl]propane, 2,2-bis(4-aminophenyl)hexafluoropropane, and 2,2-bis[4-(4-aminophenoxy)phenyl]hexafluoropropane, alicyclic diamines such as bis(4-aminocyclohexyl)methane and bis(4-amino-3-methylcyclohexyl)methane, and aliphatic diamines such as tetramethylenediamine and hexamethylenediamine, as well as diaminosiloxanes such as

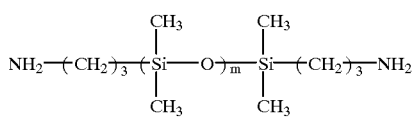

(wherein m is an integer of from 1 to 10.)

Further, for the purpose of increasing the tilt angle, a diamine having a long chain alkyl group represented by 4,4'-diamino-3-dodecyldiphenyl ether or 1-dodecanoxy-2,4-diaminobenzene, may be used. these diamine components may be used alone or in combination as a mixture of two or more of them.

A synthetic method for such a polyamide is not particularly limited. Usually, it can be obtained by charging a dicarboxylic acid or its derivative and a diamine in equimolar amounts and subjecting them to a polycondensation reaction in an organic solvent.

This polycondensation reaction proceeds smoothly in the presence of a condensing agent. The condensing agent to be used here may, for example, be triphenyl phosphite, tetrachlorosilane or dimethylchlorosilane when a dicarboxylic acid is used as the monomer, or triethylamine, pyridine or N,N-dimethylaniline when a halide of a dicarboxylic acid is used as the monomer.

Further, this reaction is preferably carried out in an organic solvent, and specific examples of the solvent to be used include N,N-dimethylformamide, N,N-dimethylacetoamide, N-methyl-2-pyrrolidone, N-methylcaprolactam, tetrahydrofuran, dioxane, toluene, chloroform, dimethylsulfoxide, tetramethylurea, pyridine, dimethylsulfone, hexamethylphospholamide, butyllactone and cresol.

The reaction temperature in this condensation reaction is usually preferably within a temperature range of from room temperature to about 200° C.

On the other hand, in a case where the above-mentioned dicarboxylic anhydride or alkyl ester compound is employed as a monomer, the polycondensation reaction will proceed satisfactorily usually without employing the above-mentioned condensing agent and solvent, by mixing a diamine compound, followed by heat dissolving under vacuum.

The reduced viscosity of the resin obtained by the above described production method is preferably from 0.05 to 3.0 dl/g (in N-methyl-2-pyrrolidone at a temperature of 30° C., concentration: 0.5 g/dl). Further, the number average molecular weight is preferably at least 1000 with a view to utilizing the characteristics of the polymer. The molecular weight can be measured by a known method such as gel permeation chromatography, an osmotic method, a light scattering method or a viscosity method.

The polymer compound in the present invention is not particularly limited so long as it contains photochemically reactive groups in its main chain and has a glass transition point of at least 200° C. For example, in a polyimide represented by the following formula (10):

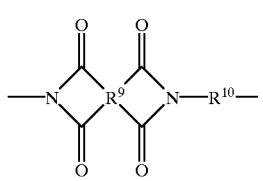

(9)

(wherein $R^9$ is a tetravalent organic group, and $R^{10}$ is a bivalent organic group), a photochemically reactive group may be contained in either the tetracarboxylic acid component or the diamine component, or photochemically reactive groups may be contained in both the tetracarboxylic acid component and the diamine component. Further, within a range where the effects of the present invention can be obtained, other tetracarboxylic acid components and diamine components may also be incorporated.

Specific examples of the tetracarboxylic acid component having a photochemically reactive group include tetracarboxylic acids such as cycloocta-1,5-diene-1,2,5,6-tetracarboxylic acid:

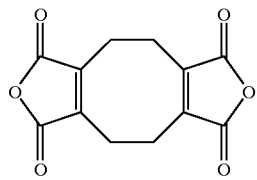

(21)

and cis-3,7-dibutylcycloocta-1,5-diene-1,2,5,6-tetracarboxylic acid:

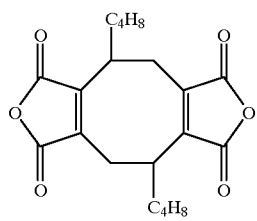

(22)

and their acid halides, acid anhydrides and alkyl esters.

Specific examples of the diamine component having a photochemically reactive group include, like a polyamide, buta-1,3-diene-1,4-diamine, hexa-2,4-diene-1,6-diamine, octa-3,5-diene-1,8-diamine, 4-(4-(4-aminophenyl)buta-1,3-dienyl)phenylamine, but-2-yne-1,4-diamine, hex-3-yne-2,5-diamine, 1,8-diaminooct-4-yne-2,7-diol, hex-1,5-diyne-1,6-diamine, 3-(2-(3-aminophenyl)ethynyl)phenylamine, 3-(2-(4-aminophenyl)ethynyl)phenylamine, 4-(2-(4-aminophenyl)ethynyl)phenylamine, 2-(2-(2-aminophenyl)ethynyl)phenylamine, 5-(2-(3-aminophenyl)ethynyl)-2-fluorophenylamine, 4-(2-( 3-aminophenyl)ethynyl)-3-(trifluoromethyl)phenylamine, 5-(2-(2-amino-4-methoxyphenyl)ethynyl)-2-nitrophenylamine, 2-(2-(3-amino-4-methoxyphenyl)ethynyl)-5-nitrophenylamine, 4,4'-diaminochalcone, 1,4-(bis-(4-aminobenzoylethenyl))benzene and 1,3-(bis-(4-aminobenzylidene))acetone. These diamine compounds may be used alone or in combination as a mixture of two or more of them.

Further, from the viewpoint of the sensitivity for the photochemical reaction, 4,4'-diaminochalcone, 1,4-(bis-(4-aminobenzoylethenyl))benzene or 1,3-(bis-(4-aminobenzylidene))acetone is preferred.

From the viewpoint of the stability of alignment of liquid crystal, repeating units containing the above-mentioned photochemically reactive groups are contained preferably in an amount of from 20 to 100 mol %, more preferably from 50 to 100 mol %, based on the entire polymer components.

Specific examples of the tetracarboxylic acid having no photochemically reactive group, include aromatic tetracarboxylic acids such as 1,2,3,4-cyclobutanetetracarboxylic acid, 1,2,3,4-cyclopentanetetracarboxylic acid, 2,3,4,5-tetrahydrofurantetracarboxylic acid, 1,2,4,5-cyclohexanetetracarboxylic acid, 3,4-dicarboxy-1-cyclohexylsuccinic acid, 3,4-dicarboxy-1,2,3,4-tetrahydro-1-naphthalenesuccinic acid, pyromellitic acid, 2,3,6,7-naphthalenetetracarboxylic acid, 1,2,5,6-naphthalenetetracarboxylic acid, 1,4,5,8-naphthalenetetracarboxylic acid, 2,3,6,7-anthracenetetracarboxylic acid, 1,2,5,6-anthracenetetracarboxylic acid, 3,3',4,4'-biphenyltetracarboxylic acid, 2,3,3',4-biphenyltetracarboxylic acid, bis(3,4-dicarboxyphenyl) ether, 3,3',4,4'-benzophenonetetracarboxylic acid, bis(3,4-dicarboxyphenyl)sulfone, bis(3,4-dicarboxyphenyl) methane, 2,2-bis(3,4-dicarboxyphenyl)propane, 1,1,1,3,3,3-hexafluoro-2,2-bis(3,4-dicarboxyphenyl)propane, bis(3,4-dicarboxyphenyl)dimethylsilane, bis(3,4-dicarboxyphenyl) diphenylsilane, 2,3,4,5-pyridinetetracarboxylic acid and 2,6-bis(3,4-dicarboxyphenyl)pyridine, and their dianhydrides and dicarboxylic acid diacid halides, and aliphatic tetracarboxylic acids such as 1,2,3,4-butanetetracarboxylic acid, and their dianhydrides and dicarboxylic acid diacid halides. Further, these tetracarboxylic acids and their derivatives may be used alone or in combination as a mixture of two or more of them.

Further, specific examples of the diamine component having no photochemically reactive group in the present invention, are primary diamines which are commonly used for the synthesis of polyimides and are not particularly limited. Such specific examples include aromatic diamines such as p-phenylenediamine, m-phenylenediamine, 2,5-diaminotoluene, 2,6-diaminotoluene, 4,4'-diaminobiphenyl, 3,3'-dimethyl-4,4'-diaminobiphenyl, 3,3'-dimethoxy-4,4'-diaminobiphenyl, diaminodiphenylmethane, diaminodiphenyl ether, 2,2'-diaminodiphenylpropane, bis(3,5-diethyl-4-aminophenyl)methane, diaminodiphenylsulfone, diaminobenzophenone, diaminonaphthalene, 1,4-bis(4-aminophenoxy)benzene, 1,4-bis(4-aminophenyl)benzene, 9,10-bis(4-aminophenyl)anthracene, 1,3-bis(4-aminophenoxy)benzene, 4,4'-bis(4-aminophenoxy) diphenylsulfone, 2,2-bis[4-(4-aminophenoxy)phenyl] propane, 2,2-bis(4-aminophenyl)hexafluoropropane, and 2,2-bis[4-(4-aminophenoxy)phenyl]hexafluoropropane, alicyclic diamines such as bis(4-aminocyclohexyl)methane and bis(4-amino-3-methylcyclohexyl)methane, and aliphatic diamines such as tetramethylenediamine and hexamethylenediamine, as well as diaminosiloxanes such as

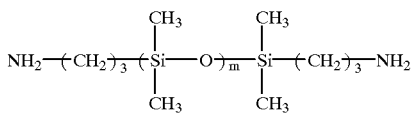

(m is an integer of from 1 to 10).

Further, for the purpose of increasing the tilt angle, a diamine having a long chain alkyl group, represented by 4,4'-diamino-3-dodecyldiphenyl ether or 1-dodecanoxy-2,4-diaminobenzene, may be employed. These diamine components may be used alone or in combination as a mixture of two or more of them.

The method for producing such polyimides is not particularly limited. Usually, a tetracarboxylic acid or its derivative is reacted and polymerized with a diamine to form a polyimide precursor, which is subjected to ring closure imide modification. As the tetracarboxylic acid or its derivative to be used here, it is common to employ a tetracarboxylic dianhydride. The ratio of the molar amount of the tetracarboxylic dianhydride to the total molar amount of the diamine is preferably from 0.8 to 1.2. Like a usual polycondensation reaction, the closer the molar ratio to 1, the larger the polymerization degree of the resulting polymer.

If the polymerization degree is too small, the strength of the polyimide film tends to be inadequate when it is used as an alignment film, and alignment of liquid crystal tends to be unstable.

On the other hand, if the polymerization degree is too large, the operation efficiency during formation of a polyimide film is likely to be poor.

Accordingly, the polymerization degree of the product in this reaction is preferably such that the reduced viscosity of the polyimide precursor is from 0.05 to 3.0 dl/g (in N-methylpyrrolidone at a temperature of 30° C., concentration: 0.5 g/dl).

The method for reacting and polymerizing the tetracarboxylic acid dianhydride with the diamine is not particularly limited. Usually, a primary diamine and a tetracarboxylic dianhydride are reacted in an organic polar solvent such as N-methylpyrrolidone, N,N-dimethylacetoamide or N,N-dimethylformamide to obtain a polyimide precursor, followed by dehydration ring closure imide modification.

The temperature for the reaction and polymerization of the tetracarboxylic acid or its derivative with the diamine may be at an optional temperature within a range of from −20 to 150° C., but it is particularly preferably within a range of from −5 to 100° C.

Further, this polyimide precursor may be dehydrated by heating at a temperature of from 100 to 400° C. or subjected to chemical imide-modification by means of an imide-modification catalyst which is commonly used, such as a triethylamine/acetic anhydride, to obtain a polyimide.

Further, to form a polyimide coating film, usually, a polyimide precursor solution may be coated as it is, on a substrate and heated on the substrate for imide-modification to form a polyimide coating film. For the polyimide precursor solution to be used here, the above-mentioned polymerization solution may be employed as it is, or the formed polyimide precursor solution may be put into a large excess amount of a poor solvent such as water or methanol to precipitate and recover the precursor, which may be dissolved again in a solvent and used. The solvent for the diluted solution of the above polyimide precursor solution and/or the redissolved solution of the precipitated and recovered polyimide precursor, is not particularly limited so long as it is capable of dissolving the polyimide precursor.

Specific examples of such a solvent include N-methylpyrrolidone, N,N-dimethylacetoamide and N,N-dimethylformamide. These solvents may be used alone or in combination as a mixture. Further, even in the case of a solvent whereby a uniform solution is hardly obtainable by itself, such a solvent may be added and used within a range where a uniform solution can be obtained.

Further, as the temperature for heating on the substrate for imide-modification, an optional temperature within a range of from 100 to 400° C. may be employed, but it is preferably within a range of from 150 to 350° C.

On the other hand, when the polyimide is soluble in a solvent, the polyimide precursor solution obtained by reacting a tetracarboxylic dianhydride with a diamine, can be imide-modified in the solution to obtain a polyimide solution.

For conversion of the polyimide precursor to a polyimide, it is common to employ a method for dehydration ring closure by heating. As the temperature for ring closure by dehydration under heating, an optional temperature within a range of from 100 to 350° C., preferably from 120 to 250° C., may be selected.

Further, as another method for converting the polyimide precursor to a polyimide, a known catalyst for dehydration ring closure may be employed to carry out the ring closure chemically.

The polyimide solution thus obtained may be used as it is. Otherwise, it may be precipitated in a poor solvent such as methanol or ethanol, then isolated and re-dissolved in a suitable solvent for use.

The solvent for the redissolution is not particularly limited so long as it is capable of dissolving the obtained polyimide. For example, 2-pyrrolidone, N-methylpyrrolidone, N-ethylpyrrolidone, N-vinylpyrrolidone, N,N-dimethylacetoamide, N,N-dimethylformamide and γ-butyrolactone may be mentioned.

Further, even a solvent which is incapable of dissolving a polyimide by itself, may be added to the above solvent within a range not to impair the solubility. Even in the case of a solvent whereby a uniform solution can not be obtained, such a solvent may be added and used within a range wherein a uniform solution can be obtained. As such an example, ethyl cellosolve, butyl cellosolve, ethyl carbitol, butyl carbitol, ethyl carbitol acetate or ethylene glycol may be mentioned.

This solution is coated on a substrate, and the solvent is evaporated to form a polyimide coating film on the substrate. The temperature at that time is sufficient if the solvent evaporates, and is usually sufficient at a level of from 80 to 150° C.

The solution of the treating agent for liquid crystal alignment of the present invention obtained as described above, is coated on a substrate by means of a method such as spin coating or transfer printing, and the coated solution is heated and baked under the above conditions to form a polymer film. The thickness of the polymer film at that time, is not particularly limited, but is usually from 100 to 3000 nm to be used as a usual liquid crystal alignment film.

Then, on the surface of the polymer film, ultraviolet rays polarized via a polarizing plate will be irradiated in a predetermined direction to the substrate. With respect to the wavelength of the ultraviolet rays to be used, ultraviolet rays within a range of from 100 nm to 400 nm may usually be employed. Particularly preferably, it is advisable to select a suitable wavelength via e.g. a filter depending upon the type of the polymer to be used.

The time for irradiation of the ultraviolet rays is usually within a range of from a few seconds to a few hours, but it may be suitably selected depending upon the polymer to be used.

Further, the method of irradiating the polarize ultraviolet rays is not particularly limited. Irradiation may be made by rotating the plane of polarization, or irradiation may be carried out more than two times by changing the incident angle of the polarized ultraviolet rays. Further, it is sufficient that polarized light is substantially obtained, and non-polarized ultraviolet rays may be irradiated with a certain angle of inclination from the normal line of the substrate.

A pair of substrates thus irradiated with polarized ultraviolet rays, are prepared and disposed so that the polymer film surfaces face to each other with liquid crystal sandwiched between them, whereby liquid crystal molecules can be aligned, and the alignment is thermally stable.

EXAMPLES

Now, the present invention will be described in further detail with reference to Examples, but the present invention is by no means restricted thereto.

Example 1

In a nitrogen stream, 8.5 g (20.7 mmol) of 2,2-bis(4-aminopheoxyphenyl)propane and 3.0 g (21.1 mmol) of muconic acid were dissolved in 70 cc of N-methylpyrrolidone (hereinafter referred to simply as NMP). To this solution, 13.1 g (42.2 mmol) of triphenyl phosphite and 10.5 cc of pyridine were sequentially added. The mixture was stirred at 100° C. for 3 hours. The obtained reaction mixture was diluted with NMP and then poured into methanol. A precipitated polymer was collected by filtration and dried. This was again dissolved in NMP and then poured into methanol. A precipitated polymer was collected by filtration and dried. The above operation was repeated again, and purification was carried out to obtain 7 g of a polyamide. The obtained polyamide was dissolved in NMP, and its reduced viscosity was measured, whereby it was 1.1 dl/g (concentration: 0.5 g/dl, in NMP, 30° C.). Further, the obtained polyamide varnish was coated on a glass substrate and dried to obtain a film, and the glass transition temperature measured by TMA (thermal mechanical analysis) using the film, was 315° C.

This polyamide was dissolved in NMP to prepare a solution having a total solid content of 3 wt %. This solution was spin coated at 3600 rpm on a glass substrate, followed by heat treatment at 80° C. for 10 minutes and 180° C. for 30 minutes, to obtain a polyamide resin film having a thickness of 100 nm. A pair of glass substrates coated with polyamide resin films, thus obtained, were prepared, and on the respective polyamide resin films, polarized ultraviolet rays having a wavelength of from 300 nm to 330 nm from an ultra high pressure mercury lamp with an output power of 700 W, were irradiated for 5 minutes via a band pass filter and a polarizing plate. The pair of substrates irradiated with polarized ultraviolet rays were bonded with fine polymer particles of 6 µm interposed therebetween, so that the polyamide surfaces faced inwardly, and the directions of irradiated polarized ultraviolet rays became parallel to each other, to obtain a liquid crystal cell. This cell was maintained at a temperature of at least the isotropic temperature of liquid crystal on a hot plate, and liquid crystal (ZLI-2293, manufactured by Merck Co.) was injected. This cell was cooled to room temperature and then rotated under crossed Nicols of a polarization microscope, whereby a clear contrast appeared, and no defect was observed, and thus it was confirmed that liquid crystal was uniformly aligned.

Further, the prepared liquid crystal cell was heat treated in an oven of 120° C. for one hour and then cooled to room temperature. This liquid crystal cell was rotated under crossed Nicols of a polarization microscope, whereby a clear contrast appeared, and no defect was observed, and thus it was confirmed that the uniform alignment of liquid crystal before the heat treatment, was maintained.

Example 2

In a nitrogen stream, 3.6 g (8.7 mmol) of 2,2-bis(4-aminophenoxyphenyl)propane and 1.0 g (8.85 mmol) of acetylenedicarboxylic acid were dissolved in 30 cc of NMP. To this solution, 5.4 g (17.4 mmol) of triphenyl phosphaite and 2.6 cc of pyridine were sequentially added. This was stirred at 100° C. for 4 hours. The obtained reaction mixture was diluted with NMP and then poured into methanol. A precipitated polymer was collected by filtration and dried. This was again dissolved in NMP and then poured into methanol. A precipitated polymer was collected by filtration and dried. The above operation was repeated again, and purification was carried out to obtain 4 g of a polyamide. The obtained polyamide was dissolved in NMP, and its reduced viscosity was measured, and it was 0.8 dl/g (concentration: 0.5 g/dl, in NMP, 30° C.). Further, the obtained polyamide varnish was coated on a glass substrate and dried to obtain a film, and using this film, the glass transition temperature was measured by TMA, but no clear glass transition point was shown.

This polyamide was dissolved in NMP to obtain a solution having a total solid content of 7 wt %. This solution was spin-coated at 2800 rpm on a glass substrate, followed by heat treatment at 80° C. for 10 minutes and at 120° C. for 30 minutes to obtain a polyamide resin film having a thickness of 100 nm. In the same manner as in Example 1, polarized ultraviolet rays were irradiated to the polyamide resin film and then a liquid crystal cell was prepared. This cell was rotated under crossed Nicols of a polarization microscope, whereby a clear contrast appeared, and no defect was observed, and thus it was confirmed that the liquid crystal was uniformly aligned.

Further, the prepared liquid crystal cell was heat treated in an oven of 120° C. for one hour and then cooled to room temperature. This liquid crystal cell was rotated under crossed Nicols of a polarization microscope, whereby a clear contrast appeared, and no defect was observed, and it was confirmed that the uniform liquid crystal alignment before the heat treatment was maintained.

Example 3

In a nitrogen stream, 4.7 g (11.6 mmol) of 2,2-bis(4-aminophenoxyphenyl)propane, 1.2 g (8.3 mmol) of muconic acid and 0.4 g (3.5 mmol) of acetylene dicarboxylic acid were dissolved in 55 cc of NMP. To this solution, 7.2 g (23.1 mmol) of triphenyl phosphite and 3.5 cc of pyridine were sequentially added. This was stirred at 100° C. for 4 hours. The obtained reaction mixture was diluted with NMP and then poured into methanol. A precipitated polymer was collected by filtration and dried. This was again dissolved in NMP and then poured into methanol. A precipitated polymer was collected by filtration and dried. The above operation was repeated again, and purification was carried out to obtain 6.7 g of a polyamide. The obtained polyamide was dissolved in NMP, and its reduced viscosity was measured, whereby it was 1.0 dl/g (concentration: 0.5 g/dl, in NMP, at 30° C.). Further, the obtained polyamide varnish was coated on a glass substrate and dried to obtain a film, and using the film, the glass transition temperature was measured by THA, but no clear glass transition point was shown.

This polyamide was dissolved in NMP to prepare a solution having a total solid content of 7 wt %. This solution was spin coated at 3600 rpm on a glass substrate, followed by heat treatment at 80° C. for 10 minutes and at 120° C. for 30 minutes to obtain a polyamide resin film having a thickness of 100 nm. In the same manner as in Example 1, polarized ultraviolet rays were irradiated to the polyamide resin film, and then a liquid crystal cell was prepared. This cell was rotated under crossed Nicols of a polarization microscope, whereby a clear contrast appeared, and no defect was observed, and thus it was confirmed that the liquid crystal was uniformly aligned.

Further, the prepared liquid crystal cell was heat treated in an oven of 120° C. for one hour and then cooled to room temperature. This liquid crystal cell was rotated under crossed Nicols of a polarization microscope, whereby a clear contrast appeared, and no defect was observed, and thus it was confirmed that the uniform liquid crystal alignment before heat treatment was maintained.

Example 4

A polyamide was synthesized in the same manner as in Example 1 except that 4.2 g (10.0 mmol) of 2,2-bis(4-aminophenoxyphenyl)propane, 5.2 g (10.0 mmol) of 2,2-bis (4-aminophenoxyphenyl)hexafluoropropane and 3.0 g (21.1 mmol) of muconic acid were used as monomers. The obtained polyamide was dissolved in NMP, and its reduced viscosity was measured, whereby it was 1.3 dl/g (concentration: 0.5 g/dl, in NMP at 30° C.). Further, the obtained polyamide varnish was coated on a glass substrate and dried to obtain a film, and the glass transition temperature measured by TMA using the film, was 330° C.

This polyamide was dissolved in NMP to prepare a solution having a total solid content of 3 wt %. This solution was spin coated at 3800 rpm on a glass substrate, followed by heat treatment at 80° C. for 10 minutes and at 180° C. for 30 minutes to obtain a polyamide resin film having a thickness of 100 nm. A pair of glass substrates coated with the polyamide resin films thus obtained, were prepared, and polarized ultraviolet rays with a wavelength of from 300 nm to 330 nm from an ultra high pressure mercury lamp with an output power of 700 W, were irradiated via a band pass filter and a polarizing plate to the respective polyamide resin films, and further, by rotating the plane of polarization at 90° C., polarized ultraviolet rays were irradiated for 25 minutes at an incident angle of 45°. The pair of substrates irradiated with the polarized ultraviolet rays were bonded with fine polymer particles of 6 μm interposed therebetween, so that the polyamide surfaces faced inwardly, and the direction of obliquely irradiated polarized ultraviolet rays would be oppositely in parallel with each other, to obtain a liquid crystal cell. This cell was maintained at a temperature of at least the isotropic temperature of liquid crystal on a hot plate, and liquid crystal (ZLI-2293, manufactured by Merck Co.) was injected. This cell was cooled to room temperature and then rotated under crossed Nicols of a polarization microscope, whereby a clear contrast appeared, and no defect was observed, and thus it was confirmed that liquid crystal was uniformly aligned.

Further, the prepared liquid crystal cell was heat treated in an oven of 120° C. for one hour and then cooled to room temperature. This liquid crystal cell was rotated under crossed Nicols of a polarization microscope, whereby a clear contrast appeared, and no defect was observed, and thus it was confirmed that the uniform liquid crystal alignment before the heat treatment was maintained.

Example 5

A polyamide was synthesized in the same manner as in Example 1 except that 4.2 g (10.0 mmol) of 2,2-bis(4-aminophenoxyphenyl)propane, 3.5 g (10.0 mmol) of 1-hexadecanoxy-2,4-diaminobenzene and 3.0 g (21.1 mmol) of muconic acid were employed as monomers. The obtained polyamide was dissolved in NMP, and its reduced viscosity was measured, whereby it was 0.85 dl/g (concentration: 0.5 g/dl, in NMP at 30° C.). Further, the obtained polyamide varnish was coated on a glass substrate and dried to obtain a film, and the glass transition temperature measured by TMA using the film, was 250° C.

This polyamide was dissolved in NMP to prepare a solution having a total solid content of 3 wt %. This solution was spin coated at 3000 rpm on a glass substrate, followed by heat treatment at 80° C. for 10 minutes and at 180° C. for 30 minutes, to obtain a polyamide resin film having a thickness of 100 nm. In the same manner as in Example 4, polarized ultraviolet rays were irradiated to the polyamide resin film and then, a liquid crystal cell was prepared. This cell was rotated under crossed Nicols of a polarization microscope, whereby a clear contrast appeared, and no defect was observed, and thus it was confirmed that liquid crystal was uniformly aligned.

Further, the prepared liquid crystal was heat treated in an oven of 120° C. for one hour and then cooled to room temperature. This liquid crystal cell was rotated under crossed Nicols of a polarization microscope, whereby a clear contrast appeared, and no defect was observed, and thus it was confirmed that the uniform liquid crystal alignment before the heat treatment was maintained.

Example 6

In a nitrogen stream, 2.5 g (6.9 mmol) of cis-3,7-dibutylcycloocta-1,5-diene-1,2,5,6-tetracarboxylic acid and 1.4 g (6.9 mmol) of 4,4'-diaminodiphenyl ether were dissolved in 25 ml of m-cresol. 0.8 ml of quinoline was added thereto, followed by stirring at 110° C. for 44 hours. The obtained reaction product was poured into methanol, and a precipitated polymer was collected by filtration and dried to obtain a polyimide powder. This polyimide was dissolved in NMP, and its reduced viscosity was measured, whereby it was 1.0 dl/g (concentration: 0.5 g/dl, in NMP at 30° C.). Further, the obtained polyimide varnish was coated on a glass substrate and dried to obtain a film, and the glass transition point evaluated by TMA using the film, was 280° C.

This polyimide was dissolved in NMP to prepare a solution having a total solid content of 5 wt %. This solution was spin coated at 3500 rpm on a glass substrate, followed by heat treatment at 80° C. for 10 minutes and at 180° C. for 30 minutes, to obtain a polyimide resin film having a thickness of 100 nm. A pair of glass substrates coated with polyimide resin films thus obtained, were prepared, and polarized ultraviolet rays with a wavelength of from 240 nm to 280 nm from an ultra high pressure mercury lamp with an output power of 700 W, were irradiated for 5 minutes via a band pass filter and a polarizing plate to the respective polyamide resin films. The pair of substrates irradiated with the polarized ultraviolet rays were bonded with fine polymer particles of 6 μm interposed therebetween, so that the polyamide surfaces faced inwardly and the directions of irradiated polarized ultraviolet rays became in parallel with each other. This cell was maintained at a temperature of at least the isotropic temperature of liquid crystal on a hot plate, and liquid crystal (ZLI-2293, manufactured by Merck Co.) was injected. This cell was cooled to room temperature and then rotated under crossed Nicols of a polarization microscope, whereby a clear contrast appeared, and no defect was observed, and thus it was confirmed that liquid crystal was uniformly aligned.

Further, the prepared liquid crystal cell was heat treated in an oven of 120° C. for one hour and then cooled to room temperature. This liquid crystal cell was rotated under crossed Nicols of a polarization microscope, whereby a clear contrast appeared, and no defect was observed, and thus it was confirmed that the uniform liquid crystal alignment before the heat treatment was maintained.

Example 7

In a nitrogen stream, 15 g (59 mmol) of 4,4'-diaminochalcone and 11.5 g (59 mmol) of 1,2,3,4-cyclobutanetetracarboxylic dianhydride were dissolved in 150 ml of NMP and reacted at room temperature. Then, polymerization was further carried out for 48 hours. The reduced viscosity of the obtained polyimide precursor was 0.56 dl/g (concentration: 0.5 g/dl, in NMP at 30° C.). Further, the polyimide precursor was coated on a substrate and subjected to heat treatment to obtain a film, and the glass transition point measured by TMA using the film, was 310° C.

This polyimide precursor was dissolved in NMP to prepare a solution having a solid content of 4 wt %. This solution was spin coated at 2000 rpm on a glass substrate, followed by heat treatment at 80° C. for 10 minutes and at 250° C. for 60 minutes, to obtain a polyimide film having a thickness of 100 nm.

A pair of glass substrates coated with polyimide resin films thus obtained, were prepared, and polarized ultraviolet rays having a wavelength of from 300 nm to 330 nm from an ultra high pressure mercury lamp with an output power of 700 W, were irradiated for one minute via a band pass filter and a polarizing plate to the respective polyamide resin films. The pair of substrates irradiated with the polarized ultraviolet rays, were bonded with fine polymer particles of 6 μm interposed therebetween, so that the polyamide surfaces faced inwardly, and the directions of irradiated polarized ultraviolet rays became in parallel with each other, to prepare a liquid crystal cell. This cell was maintained at a temperature of at least the isotropic temperature of liquid crystal on a hot plate, and liquid crystal (ZLI-2293, manufactured by Merck Co.) was injected. This cell was cooled to room temperature and then rotated under crossed Nicols of a polarization microscope, whereby a clear contrast appeared, and no defect was observed, and thus it was confirmed that liquid crystal was uniformly aligned.

Further, the prepared liquid crystal cell was heat treated in an oven of 120° C. for 6 hours and then cooled to room temperature. This liquid crystal cell was rotated under crossed Nicols of a polarization microscope, whereby a clear contrast appeared, and no defect was observed, and thus it was confirmed that the uniform liquid crystal alignment before the heat treatment was maintained.

Example 8

In a nitrogen stream, 23 g (62 mmol) of 1,4-bis(2-(4-aminobenzoyl)ethenyl)benzene and 12.2 g (62 mmol) of 1,2,3,4-cyclobutanetetracarboxylic dianhydride were dissolved in 230 ml of N-methylpyrrolidone, and polymerization was carried out in the same manner as in Example 7. The reduced viscosity of the obtained polyimide precursor was 0.72 dl/g (concentration: 0.5 g/dl, in NMP at 30° C.).

Further, the polyimide precursor was coated on a substrate and subjected to heat treatment to obtain a film, and the glass transition point was measured by TMA using the film, but no clear glass transition point was observed.

This polyimide precursor was dissolved in NMP to prepare a solution having a solid content of 4 wt %. This solution was spin coated at 300 rpm on a glass substrate, followed by heat treatment at 80° C. for 10 minutes and at 250° C. for 60 minutes, to obtain a polyimide film having a thickness of 100 nm. In the same manner as in Example 7, polarized ultraviolet rays were irradiated to the polyimide resin film, and then, a liquid crystal cell was prepared. This cell was rotated under crossed Nicols of a polarization microscope, whereby a clear contrast appeared, and no defect was observed, and thus it was confirmed that liquid crystal was uniformly aligned.

Further, the prepared liquid crystal cell was heat treated in an oven of 120° C. for 6 hours and the cooled to room temperature. This liquid crystal cell was rotated under crossed Nicols of a polarization microscope, whereby a clear contrast appeared, and no defect was observed, and thus it was confirmed that the uniform liquid crystal alignment before the heat treatment, was maintained.

Comparative Example 1

In a nitrogen stream, 5.6 g (13.7 mmol) of 2,2-bis(4-aminophenoxyphenyl)propane and 2.0 g (13.7 mmol) of adipic acid were dissolved in 50 cc of N-methylpyrrolidone (hereinafter referred to simply as NMP). To this solution, 8.5 g (27.4 mmol) of triphenyl phosphite and 6.6 cc of pyridine were sequentially added. This was stirred at 100° C. for 4.5 hours. The obtained reaction mixture was diluted with NMP and then poured into methanol. A precipitated polymer was collected by filtration and dried. This was again dissolved in NMP and then poured into methanol. A precipitated polymer was collected by filtration and dried. The above operation was repeated again, and purification was carried out to obtain 7.5 g of a polyamide. The obtained polyamide was dissolved in NMP, and its reduced viscosity was measured, whereby it was 1.0 dl/g (concentration: 0.5 g/dl, in NMP at 30° C.). Further, the obtained polyamide varnish was coated on a glass substrate and dried to obtain a film, and the glass transition temperature measured by TMA (thermal mechanical analysis) using the film, was 140° C.

This polyamide was dissolved in NMP to prepare a solution having a total solid content of 3 wt %. This solution was spin coated at 3500 rpm on a glass substrate, followed by heat treatment at 80° C. for 10 minutes and at 180° C. for 30 minutes, to obtain a polyamide resin film having a thickness of 100 nm. In the same manner as in Example 1, polarized ultraviolet rays were irradiated to the polyamide resin film, and then, a liquid crystal cell was prepared. This cell was rotated under crossed Nicols of a polarization microscope, whereby many defects were observed although a certain contrast appeared, and liquid crystal was not uniformly aligned.

Comparative Example 2

Polyvinyl cinnamate (molecular weight: about 2000) was dissolved in a solvent mixture of monochlorobenzene and dichloromethane to prepare a solution having a total solid content of 2 wt %. This solution was spin coated at 2000 rpm on a glass substrate, followed by heat treatment at 80° C. for 10 minutes and at 100° C. for one hour, to obtain a coating film having a thickness of 100 nm.

To this polyvinyl cinnamate film, polarized ultraviolet rays were irradiated in the same manner as in Example 1, and a liquid crystal cell was prepared. However, the time for irradiation of the ultraviolet rays was one minute. This cell was rotated under crossed Nicols of a polarization microscope, whereby a clear contrast appeared, and no defect was observed, and thus a uniform liquid crystal alignment was obtained. However, when the liquid crystal cell was heat treated at 120° C. and cooled to room temperature, and then the liquid crystal cell was observed under crossed Nicols of a polarization microscope, many defects were observed, and the liquid crystal alignment before the heat treatment was not maintained, and it was confirmed that the alignment was irregular.

INDUSTRIAL APPLICABILITY

With the treating agent for liquid crystal alignment of the present invention, liquid crystal molecules can be aligned uniformly and stably by irradiating polarized ultraviolet rays in a predetermined direction to a resin film surface formed on a substrate, without carrying out rubbing treatment like a conventional treating method for liquid crystal alignment.

What is claimed is:

1. A treating agent for liquid crystal alignment in a method in which a polymer thin film formed on a substrate in a predetermined direction relative to the plane of the substrate is irradiated with polarized ultraviolet rays or by electron rays, and said substrate for aligning a liquid crystal not having been subject to a rubbing treatment, wherein said agent for liquid crystal alignment contains a polymer compound having photochemically reactive groups in the polymer main chain of at least one type selected from the group consisting of bivalent structural units (1) to (4):

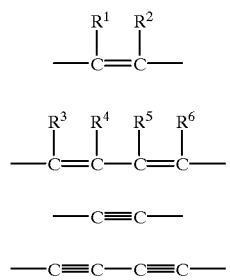

wherein each of $R^1$, $R^2$, $R^3$ and $R^4$ which are independent of one another, is hydrogen, a $C_1$–$C_4$ alkyl group, a $C_2$–$C_4$ alkenyl group, a $C_2$–$C_4$ alkynyl group, a $C_1$–$C_4$ alkoxy group, a trifluoromethyl group or fluorine, and a glass transition temperature of at least 200° C.

2. The treating agent for liquid crystal alignment according to claim 1, wherein the photochemically reactive groups in the polymer main chain are photochemically reactive groups of at least one type selected from the following structural units (5) to (6):

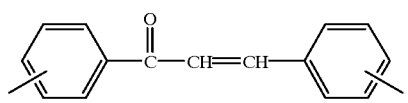

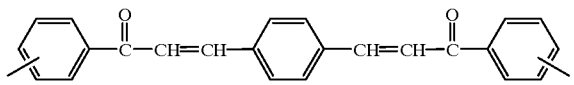

3. The treating agent for liquid crystal alignment according to claim 1, wherein the polymer compound is a polyamide resin having repeating units represented by the formula (7):

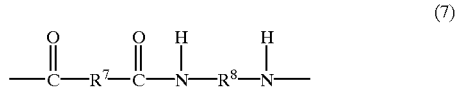

wherein $R^7$ and $R^8$ are bivalent organic groups, and at least one of $R^7$ and $R^8$ has a photochemically reactive group represented by the above (1) to (6), and the reduced viscosity of said resin is from 0.05 to 3.0 dl/g at a concentration of 0.5 g/dl in N-methyl-2-pyrrolidone at 30° C.

4. The treating agent for liquid crystal alignment according to claim 3, wherein the polyamide resin is a polyamide resin containing from 20 to 100 mol % of repeating units represented by the following formula (8):

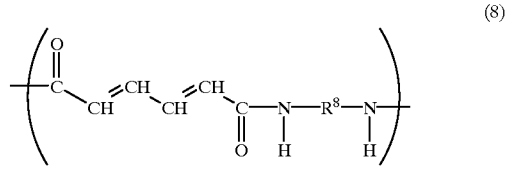

wherein $R^8$ is a bivalent organic group.

5. The treating agent for liquid crystal alignment according to claim 1, wherein the polymer compound is a polyimide having repeating units represented by the formula (9):

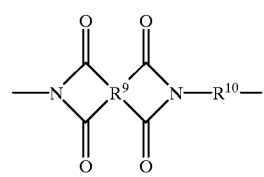

wherein $R^9$ is a tetravalent organic group, $R^{10}$ is a bivalent organic group, and at least one of $R^9$ and $R^{10}$ has a photochemically reactive group represented by the above (1) to (6), which is obtainable by chemically or thermally imidating a polyimide resin precursor, and the reduced viscosity of said polyimide precursor is from 0.05 to 3.0 dl/g at a concentration of 0.5 g/dl in N-methyl-2-pyrrolidone at a temperature of 30° C.-

6. The treating agent for liquid crystal alignment according to claim 5, wherein in the polyimide resin having the repeating units of the above formula (9), $R^{10}$ is represented by the following formula (10) or (11):
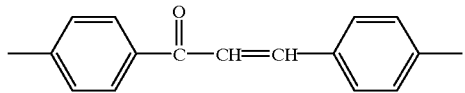
(10)
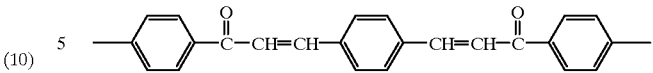
(11)
and the polyimide resin contains from 20 to 100 mol % of the repeating units.
* * * * *